US012809842B2

(12) United States Patent
Kaur

(10) Patent No.: US 12,809,842 B2
(45) Date of Patent: Nov. 24, 2026

(54) MACHINE LEARNING BASED CODE TABLE AUGMENTATION TECHNIQUES

(71) Applicant: Visa International Service Association, San Francisco, CA (US)

(72) Inventor: Harleen Kaur, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/408,422

(22) Filed: Jan. 9, 2024

(65) Prior Publication Data

US 2025/0225118 A1 Jul. 10, 2025

(51) Int. Cl.

| | |
|---|---|
| ***G06F 16/00*** | (2019.01) |
| ***G06F 11/34*** | (2006.01) |
| ***G06F 16/22*** | (2019.01) |
| ***G06F 16/23*** | (2019.01) |
| ***G06F 16/28*** | (2019.01) |

(52) U.S. Cl.

CPC ...... *G06F 16/2246* (2019.01); *G06F 11/3476* (2013.01); *G06F 16/2358* (2019.01); *G06F 16/283* (2019.01)

(58) Field of Classification Search

None

See application file for complete search history.

(56) References Cited

U.S. PATENT DOCUMENTS 7,103,608 B1 * 9/2006 Ozbutun ........... G06F 16/24557 707/693
9,262,451 B1 2/2016 Singh et al.
9,477,737 B1 * 10/2016 Charyk ............... G06F 16/2379
10,025,842 B1 * 7/2018 Charyk ............... G06F 16/2379
10,095,672 B2 * 10/2018 Theis ..................... G06Q 40/12
10,545,984 B2 * 1/2020 Zhang ................... G06F 16/221
11,461,364 B1 * 10/2022 Charyk ............... G06F 16/2379
2003/0212694 A1 * 11/2003 Potapov ............ G06F 16/24557
2005/0193040 A1 * 9/2005 Adiba ................ G06F 16/2219

(Continued)

FOREIGN PATENT DOCUMENTS

CN 113132253 A * 7/2021 ............. G06Q 40/04
TW 201317942 A * 5/2013

OTHER PUBLICATIONS

Khosravi et al., "Handling Missing Data in Decision Trees: A Probabilistic Approach", Jun. 29, 2020, 8 pages.

*Primary Examiner* — Jean M Corrielus

(74) *Attorney, Agent, or Firm* — Kilpatrick Townsend & Stockton LLP

(57) ABSTRACT

A method is disclosed. The method includes receiving a transaction message comprising a data value in a data field, determining a code table associated with the data field, and determining that the data value is not present within the code table. When the data value is not present within the code table, the method includes searching a first data storage for other transaction messages that comprise the data value. In response to searching, the method includes determining if a number of transaction messages with the data value in the first data storage exceeds a predetermined number and/or frequency. When the number of transactions messages with the data value in the first data storage exceeds the predetermined number and/or frequency, storing the transaction message comprising the data value in a second data storage.

18 Claims, 9 Drawing Sheets

(56) References Cited

U.S. PATENT DOCUMENTS

| | | | |
|---|---|---|---|
| 2007/0294221 | A1 | 12/2007 | Chen et al. |
| 2009/0030915 | A1* | 1/2009 | Winter .................. G06F 16/283 |
| 2009/0055439 | A1* | 2/2009 | Pai .................... G06F 16/24573 |
| 2009/0119309 | A1* | 5/2009 | Gibson .................. G06Q 10/10 |
| 2012/0041872 | A1* | 2/2012 | LeRoux ................. G06Q 40/00 705/39 |
| 2017/0337599 | A1* | 11/2017 | Haceaturean ........... G06F 16/22 |
| 2018/0053189 | A1* | 2/2018 | Monk ................ G06Q 30/0185 |
| 2018/0075095 | A1* | 3/2018 | Srivastava ............ G06F 16/213 |
| 2018/0341689 | A1* | 11/2018 | Zhang ................... G06F 16/221 |
| 2020/0065410 | A1* | 2/2020 | Craig ...................... G06F 16/27 |
| 2020/0372081 | A1* | 11/2020 | Bain ................... G06F 16/2358 |
| 2021/0034476 | A1* | 2/2021 | Mathur ............... G06F 11/1469 |
| 2021/0312433 | A1* | 10/2021 | Flurscheim .......... G06Q 20/385 |
| 2021/0398012 | A1* | 12/2021 | Novotny ............. G06F 16/2465 |
| 2023/0058870 | A1* | 2/2023 | Huang .................. G06F 16/245 |
| 2023/0214369 | A1 | 7/2023 | Richardson et al. |
| 2023/0418878 | A1* | 12/2023 | Wonus ................ G06F 16/9024 |
| 2024/0235838 | A1* | 7/2024 | Banow ................ H04L 63/0807 |

* cited by examiner

400

402

| T5 | |
|---|---|
| BRAZIL | 396 |
| CHILE | 442 |
| CHINA | 120 |
| EGYPT | 581 |
| FRANCE | 743 |
| INDIA | 029 |
| MEXICO | 897 |

FIG. 4

900

| | TABLE 910 | VALUE 912 | TYPE 914 | LENGTH 916 | COUNT 918 | FREQUENCY 920 | ANSWER 922 |
|---|---|---|---|---|---|---|---|
| 902 | T11 | 1 | Numeric | 1 | 11 | 50% | Yes |
| 904 | T12 | 23 | Numeric | 2 | 18 | 75% | Yes |
| 906 | T13 | AA | Character | 2 | 0 | 0 | No |
| 908 | T11 | 2 | Numeric | 1 | 15 | 50% | Yes |

FIG. 9

MACHINE LEARNING BASED CODE TABLE AUGMENTATION TECHNIQUES

CROSS-REFERENCES TO RELATED APPLICATIONS

None.

BACKGROUND

Many organizations extract insights and trends from data stored in a data warehouse in order to support decision making. Data warehouses are structured to accommodate large volumes of data without sacrificing intuitive analysis and query methods. In a data warehouse, data is usually organized in terms of fact and dimension tables. Fact tables can capture quantitative details about an event in time, such as a record, and the dimensions are used to describe characteristics of the facts.

It is desirable to design a data warehouse that enables seamless query processing. During a query, the processor can join a fact table with a code table to contextualize the fact data. However, processing can become costly and prone to interruptions when fact data is not in sync with the code table.

As an illustration, a fact table could be a table with rows of transaction data. Each row could include transaction data such as a timestamp, a transaction device type, a transaction amount, a country code, and a credential associated with an account. When a processing computer receives a transaction message with codes, the processing computer extracts them and determines their meaning using code tables. Illustratively, a processing computer can extract a device type code from a transaction message. A code table is used to determine the device type associated with the device type code. For example, the device type that was used to conduct the transaction may be a "phone" and may have a code such as "02" associated with it. Another device type may be a "card" and may have a code "01" associated with it. Yet another device type may be a "watch" and may have a code "03" associated with it. Specific processing may then occur based upon the device type. For example, if the transaction device is a phone with a secure element, then fewer authentication processes may be invoked when compared to a transaction that is conducted with a card that does not have a secure element.

It is possible that the entity that is responsible for updating the code table with new codes does not do so in a timely manner. They can occur for several reasons including delayed transmission and processing errors. If this occurs, then any transaction data with a code that is not in the code table may be discarded or may not be further processed until the transaction is evaluated by a human. Processing such transaction data where data is not recognized is costly and time and resource intensive.

Embodiments of the invention address these and other problems individually and collectively.

SUMMARY

One embodiment of the invention includes a method. The method comprising receiving, by a server computer, a transaction message comprising a data value in a data field; determining, by the server computer, a code table associated with the data field; determining, by the server computer, that the data value is not present within the code table; when the data value is not present within the code table, searching, by the server computer a first data storage for other transaction messages that comprise the data value; in response to searching, determining by the server computer, if a number of transaction messages with the data value in the first data storage exceeds a predetermined number and/or frequency; and when the number of transactions messages with the data value in the first data storage exceeds the predetermined number and/or frequency, then storing the transaction message comprising the data value in a second data storage.

Another embodiment of the invention comprises a server computer comprising: a processor; and a computer readable medium comprising code, executable by the processor for performing a method comprising: receiving, by a server computer, a transaction message comprising a data value in a data field; determining, by the server computer, a code table associated with the data field; determining, by the server computer, that the data value is not present within the code table; when the data value is not present within the code table, searching, by the server computer a first data storage for other transaction messages that comprise the data value; in response to searching, determining by the server computer, if a number of transaction messages with the data value in the first data storage exceeds a predetermined number and/or frequency; and when the number of transactions messages with the data value in the first data storage exceeds the predetermined number and/or frequency, then storing the transaction message comprising the data value in a second data storage.

These and other embodiments are described in further detail below.

BRIEF DESCRIPTION OF THE DRAWINGS

FIG. 4 shows an example country code table.

FIG. 9 shows a table of transaction data for four different transaction messages with data values.

DETAILED DESCRIPTION

Figure 1:
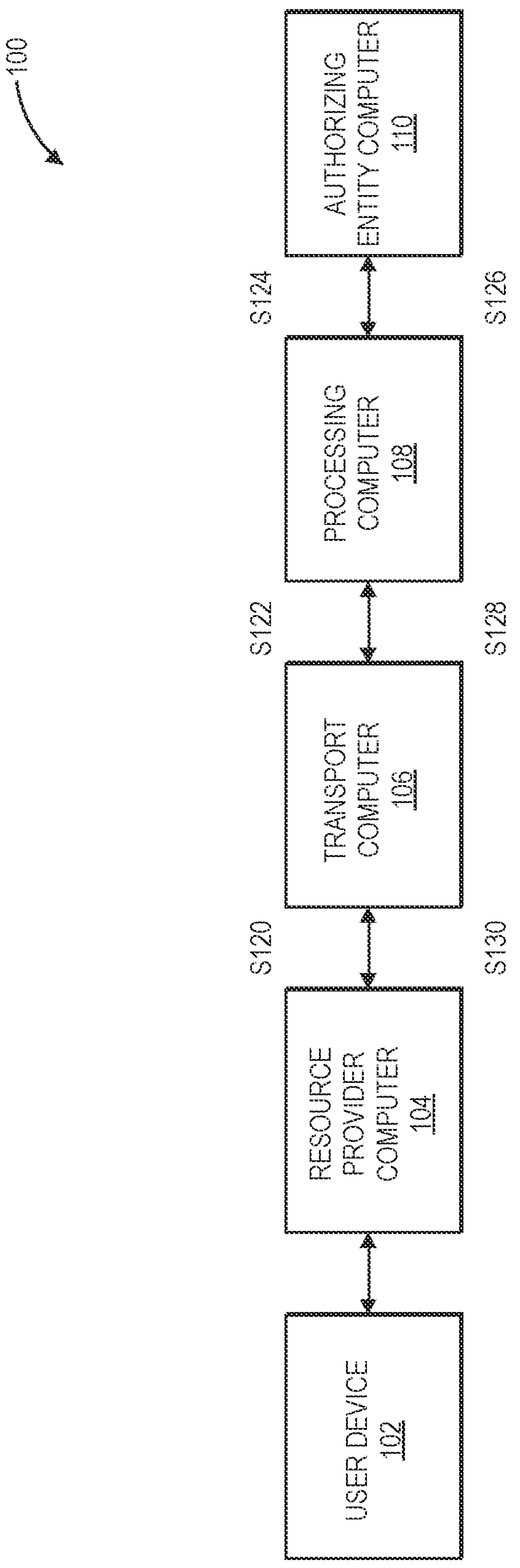
FIG. 1 shows a block diagram of a transaction processing system.

Prior to discussing embodiments of the disclosure, some terms can be described in further detail.

A "user device" may be any suitable device that can be used by a user (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "portable device" may be any suitable user device that may be transported by a user. Portable devices may include mobile phones, smartphones, payment cards, and the like.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc.

An "access device" may be any suitable device for providing access to something. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from a user device. In some embodiments, where an access device is a POS terminal, the POS terminal may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

A "data value" can include information that can be present in a data field. A data value can include any suitable alphanumeric information and can contain letters and/or numbers. In some cases, a data value can be in the form of a code, which has a meaning. The code and the meaning can be in a code table.

A "code table" can be a table that comprises codes in a column and the meaning of the codes in another column.

A "server computer" is typically a powerful computer or cluster of computers. For example, the central server computer can be a large mainframe, a minicomputer cluster, or a group of servers functioning as a unit. In one example, the central server computer may be a database server coupled to a Web server. The central server computer may also be a cloud based server.

A "resource provider" may be an entity that can provide a resource such as goods, services, information, and/or access. Examples of resource providers includes merchants, data providers, transit agencies, governmental entities, venue, and dwelling operators, etc.

An "authorizing entity" may be an entity that authorizes a request. Examples of an authorizing entity may be an issuer, a governmental agency, a document repository, an access administrator, etc.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

"Payment credentials" may include any suitable information associated with an account (e.g., a payment account and/or payment device associated with the account). Such information may be directly related to the account or may be derived from information related to the account. Examples of payment credentials may include a PAN (primary account number or "account number"), username, expiration date, and verification values such as CVV (card verification value), dCVV (dynamic card verification value), CVV2 (card verification value 2), CVC3 card verification values, etc. An example of a PAN is a 16-digit number, such as "4147 0900 0000 1234." In some embodiments, payment credentials can include additional information that may be used for authorizing a transaction. For example, payment credentials can include a cryptogram associated with the transaction.

A "token" may be a substitute value for a credential. A token may be a string of numbers, letters, or any other suitable characters. Examples of tokens include payment tokens, access tokens, personal identification tokens, etc.

A "transaction message" can be a message associated with an interaction. The interaction can be related to data access, location access, or resource access. In some cases, a transaction message can be an authorization request message, an authorization response message, a clearing message, a settlement message, a data access request message, etc.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "transport computer" may refer to an intermediary computer that can transport data. A transport computer can be a computer of an acquirer. An "acquirer" may be an entity that can process interactions on behalf of a resource provider. For example, the acquirer can be a business entity (e.g., a commercial bank) that establishes relationships with resource providers, such that the resource providers can meet transaction processing requirements. Some entities can perform both issuer and acquirer functions. Some embodiments may encompass such single entity issuer-acquirers.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "data storage" can include one or more devices for storing data. Data storages can include memories. In some cases, a data storage may be in the form of a data lake.

Embodiments of the invention address problems associated with data warehouse processing methods. Data warehouse operations often involve joining fact data to dimension data by searching a code table for a data value. In the event of a look-up miss, the processor (e.g., server computer) may encounter unknown fact data (e.g., an unknown data value such as an unknown code) if the code table has not yet been updated or the data value is invalid (e.g., a garbage value). Lookup-misses can be disruptive and require data re-processing.

As an illustration, when a user initiates a transaction, a processing computer (e.g., server computer) may receive a transaction message and store it in a data warehouse. The transaction message may comprise a data value (e.g., country code) in a data field which is associated with a code table (e.g., country code table). The processing computer can use the code table to look up the meaning of the data value. However, if the processing computer attempts to look up the data value but the data value is missing (e.g., the value is not present within the code table), then it may result in reporting errors and delays, often requiring re-processing.

Embodiments can, upon receiving a transaction message with a data value and determining that the data value is missing from the associated code table, determine whether or not the missing data value is valid or not. Based upon whether or not the missing data value is valid or not, embodiments can store the transaction message accordingly. In some cases, if the missing data value is determined to be valid, embodiments can update the code table to include the missing data value. As a result, if the processing computer encounters the data value in a future transaction message, then it will not be a look-up miss.

The data values associated with certain events that can be processed according to embodiments of the invention are not limited. Examples of events are not limited and can include transactions such as access transactions (e.g., financial transactions), message routing and processing, etc. In the context of a transaction such as an access transaction, data values that can be processed can be present in data fields in transaction messages such as authorization request messages. Specific examples of data values in this context can include credentials (e.g., primary account numbers), country codes, transaction amounts, resource provider identifiers (e.g., merchant identifiers), device types (e.g., card, phone, watch, etc.), authentication method (e.g., biometric, password, signature, etc.), etc.

FIG. 1 shows a block diagram of a transaction processing system that can be used to produce and process transaction messages. The transaction processing system in FIG. 1 is used in the context of resource access such as access to goods and services provided by a resource provider such as a merchant. However, other types of transaction processing systems can be used.

FIG. 1 shows a user device 102, which may be a payment card or phone interacting with a resource provider computer 104 which may be a merchant computer such as a POS terminal. The resource provider computer 104 is in communication with an authorizing entity computer 110 via a transport computer 106 and a processing computer 108.

In step S120, after interacting with the user device 102, the resource provider computer 104 can generate an authorization request message comprising a transaction amount and a credential such as a primary account number, or a payment token. The resource provider computer 104 can then transmit the authorization request message to the transport computer 106.

In step S122, after the transport computer 106 receives the authorization request message, the transport computer 106 can forward it to the processing computer 108.

In step S124 after receiving the authorization request message, the processing computer 108 can transmit the authorization request message to the authorizing entity computer 110.

After the authorizing entity computer 110 receives the authorization request message, it can make a determination as to whether or not the transaction is authorized. It can determine if the account associated with the credential or token has sufficient funds for the transaction. It can also determine if the transaction is potentially fraudulent by analyzing data elements of the authorization request.

In step S126, the authorizing entity computer 110 can then generate an authorization response message. The authorizing entity computer 110 can then transmit it to the processing computer 108.

In step S128, the processing computer 108 can transmit the authorization response message to the transport computer 106.

In step S130, the transport computer can transmit the authorization response message to the resource provider computer 104.

Later, a clearing and settlement process can occur between the transport computer 106, the processing computer 108, and the authorizing entity computer 110.

Figure 2:
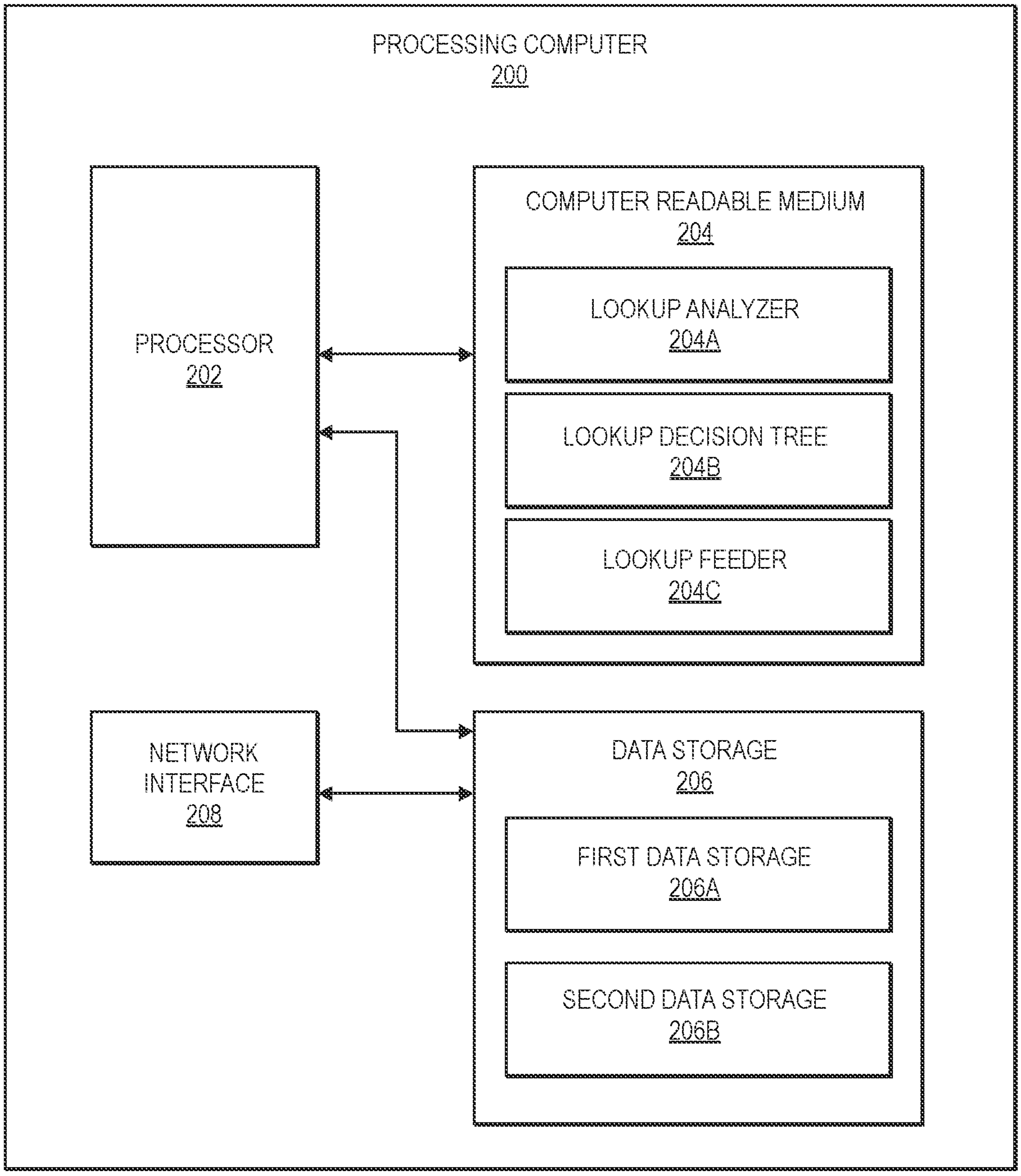
FIG. 2 shows the architecture of a processing cloud computer according to some embodiments.

FIG. 2 shows a block diagram of a processing computer according to some embodiments. The processing computer 200 may comprise a processor 202, which may be coupled to a computer readable medium 204, data storage 206, and a network interface 208.

The computer readable medium 204 may comprise several software modules including a lookup analyzer 204A, a lookup decision tree 204B, and a lookup feeder 204C.

The computer readable medium 204 may comprise code executable by the processor 202, to perform operations comprising: receiving a transaction message comprising a data value in a data field; determining a code table associated with the data field; determining that the data value is not present within the code table; when the data value is not present within the code table, searching a first data storage for other transaction messages that comprise the data value; in response to searching, determining if a number of transaction messages with the data value in the first data storage exceeds a predetermined number and/or frequency; and when the number of transactions messages with the data value in the first data storage exceeds the predetermined number and/or frequency, then storing the transaction message comprising the data value in a second data storage.

The data storage 206 may store a plurality of transaction messages, a plurality of code tables, and information related to transaction messages with missing data values (e.g., the data values are not present in the code tables corresponding to their data fields). It can also store network addresses associated with authentication server computers, authorizing entity computers, and resource provider computers.

The data storage 206 can further comprise a first data storage 206A and a second data storage 206B. The first data storage 206A may store information related to transaction messages that have data values that cannot be found in corresponding code tables. When the processing computer 200 receives a transaction message and determines that a data value in a data field in the transaction message is missing from a corresponding code table corresponding to that data field, the processing computer 200 can search the first data storage 206A for other transaction messages that have the same data value that cannot be found in the corresponding code table.

The second data storage 206B can be a data warehouse or a data lake that stores a plurality of transaction messages accumulated over time. Each transaction message may comprise one or more data values within one or more data fields. When a data value in a data field in a transaction message is determined to be missing from a code table corresponding to that data field, and the data value is determined to be valid (e.g., the number of transaction messages with the data value in the first data storage 206A exceeds the predetermined number and/or frequency), embodiments can store the transaction message in the second data storage 206B. The second data storage 206B can also store transaction messages with data values in data fields that are present in corresponding code tables.

Figure 3:
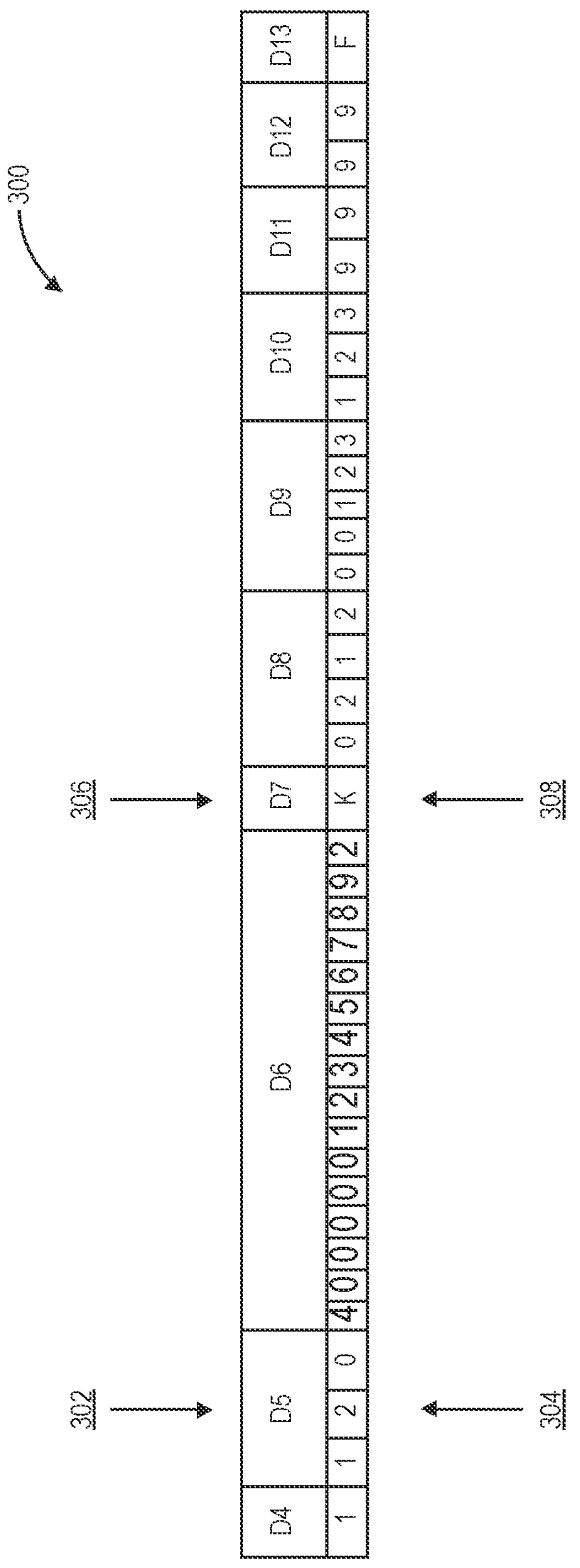
FIG. 3 shows an example data format transaction message.

FIG. 3 shows an illustration of data format 300 that can be in an example transaction message. The data in the data format can be present in data fields. Exemplary data fields can include "transaction amount," "merchant identifier," "merchant location," "primary account number," "time of day," "service code," "card acceptor ID," "country code," "device type," "authentication method," etc.

The data format 300 can comprise a data field (e.g., 302, 306) with data values (e.g., 304, 308). The data values can be any suitable numeric values and can sometimes include codes. The formats of the data values may vary depending on the data fields they are associated with. For example, data value 304 can be the 3 digits "120," in data field 302 labeled as "D5." Data value 308 can be the letter "K," in data field 306 labeled as "D7."

Some of the data fields can have associated code tables. Sometimes, two separate data fields can be associated with the same code table. The code table can be used to look up the meaning of a data value. For example, data value 308 in the data field 306 can represent a certain device type (e.g., a mobile phone) that was used to conduct the transaction. The device type data field 306 can correspond to a code table that lists different types of devices in a column and different codes corresponding to those device types. In another example, data value 304 in an originating country data field 302 can represent a certain country (e.g., France) that is associated with the country in which the transaction was originated. The originating country code data field 302 can correspond to a code table that lists different countries in a column and different three digits codes corresponding to those countries. In this example, the country code table could be used to for both country codes in an originating country data field as well as an account holder country data field which would hold a country code representing the country in which the issuer of the account of the cardholder is located.

FIG. 4 shows an example code table 400 that is a country code table. The code table 400 can list codes and what those codes represent. For example, code table 400 lists a plurality of countries with corresponding unique country codes.

As an illustrative example, the data value 304 in data field 302 from FIG. 3 can be associated with code table 400, and code table 400 can be used to look up the meaning of data value 304. Data value 304 corresponds to data value 402 since they are both the 3 digits "120." According to the code table 400, the data value 402 "120" is the country code for "CHINA." This can indicate, for example, that the transaction message associated with the data format 300 of FIG. 3 is associated with a transaction that originated in China.

Sometimes, the data value in the data field of a transaction message cannot be found in the code table. The inability to identify the data value in the code table can interrupt processing. In some cases, it may cause the transaction message to be classified as invalid or erroneous. However, sometimes the transaction message is not invalid or erroneous, because the reason the data value is not present in the code table is because the code table was not been updated in a timely manner. Assuming that the problem is eventually identified, correcting this situation takes a significant amount of time and computing resources. Further, in some cases, legitimate transactions can be inadvertently declined and the transaction information associated with the transaction may be deleted.

To address this problem, embodiments of the invention can automatically determine that a data value in a transaction message that cannot be found in a code table is valid, and store the transaction message (rather than deleting it). In embodiments of the invention, a computer (e.g., a server computer) can determine that a data value in a data field in a transaction message is not present within the code table corresponding to that data field. The computer can search a first data storage for other transaction messages comprising the data value. The computer can then determine if a number of transaction messages with that same data value are present in the first data storage. If there are several such transactions messages, then the computer determines if they exceed a predetermined number and/or frequency. If the computer determines that the number does exceed the predetermined number and/or frequency, then the data value can be classified as being valid or legitimate and the transaction message can be classified as a valid transaction. In some embodiments, the code table is then updated with the data value after the computer determines the corresponding descriptor (e.g., country) corresponding to that data value. Embodiments can also store the data value and the transaction message with the data value in a second data storage along with the updated code table. Otherwise, embodiments can record information related to the transaction message in the first data storage without updating the code table.

Figure 5:
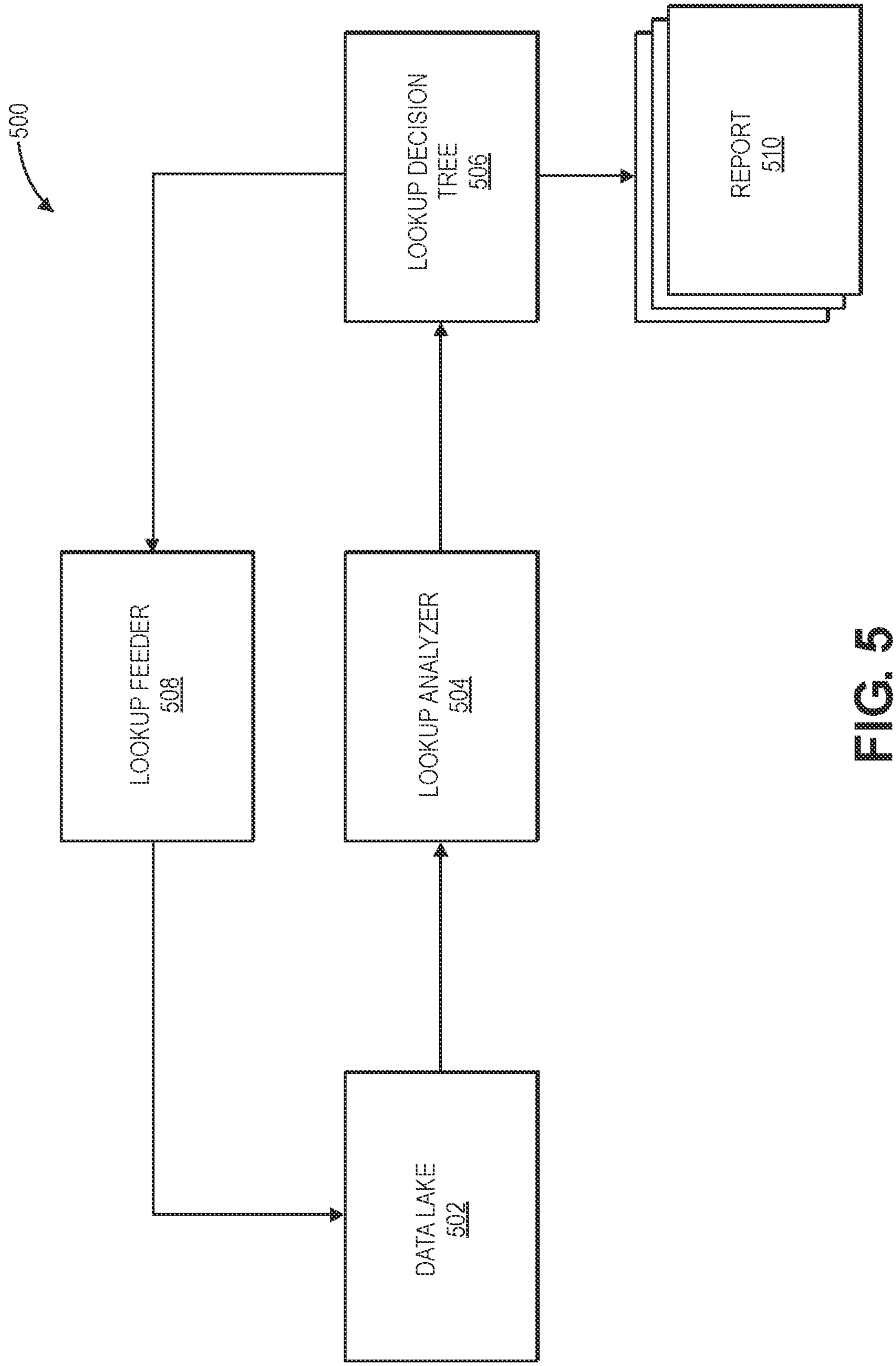
FIG. 5 shows a block diagram of a system according to embodiments.

FIG. 5 shows a block diagram of a system according to embodiments. The system can identify and sort transaction messages of a second data storage, such as data lake 502. The system can further comprise software modules including, but not limited to a lookup analyzer 504, a lookup decision tree 506, and a lookup feeder 508. The system can be components in the previously described processing computer 108, 200.

Lookup analyzer 504 can be a software module on a server computer that causes the server computer to receive a transaction message comprising a data value in a data field, determine a code table associated with the data field, determine whether or not the data value is present within the code table, and determine a number of transaction messages in a first data storage with the data value.

Lookup decision tree 506 can be a software module that causes the server computer to perform operations such as, if the lookup analyzer 504 determines the data value is not present within the code table, determine whether or not the data value is valid for the data field. In some embodiments, the lookup decision tree 506 can include a tree of binary decisions with criteria associated with these decisions. The lookup decision tree 506 can be part of a machine learning algorithm which is trained using historical transaction data and existing code tables. The machine learning algorithm can determine the appropriate criteria and decisions to be made with respect to data in each data field to arrive at a high confidence level that a particular value in a data field that is not in a code table is in fact valid or legitimate. Exemplary criteria may include, for a particular value in a particular data field, the number of transaction messages with the particular data value, the frequency of transaction messages with the particular data value, length of the data value, the type of the data value, etc. In some embodiments, based on the training data and using the machine learning algorithm, the lookup decision tree 506 can determine the number and/or frequency of transaction messages with the data value that must be stored in the first data storage to conclude that the missing data value is valid and should be added to the code table. The predetermined number and frequency can vary based upon the code table and can be updated as the machine learning model is updated with additional transaction data.

The lookup feeder 508 can store the transaction messages with data values that the lookup decision tree 506 determined to be valid in the data lake 502. The data lake 502 may be part of the second data storage 206B in FIG. 2, which can correspond to the report 510 in FIG. 5.

Figure 6:
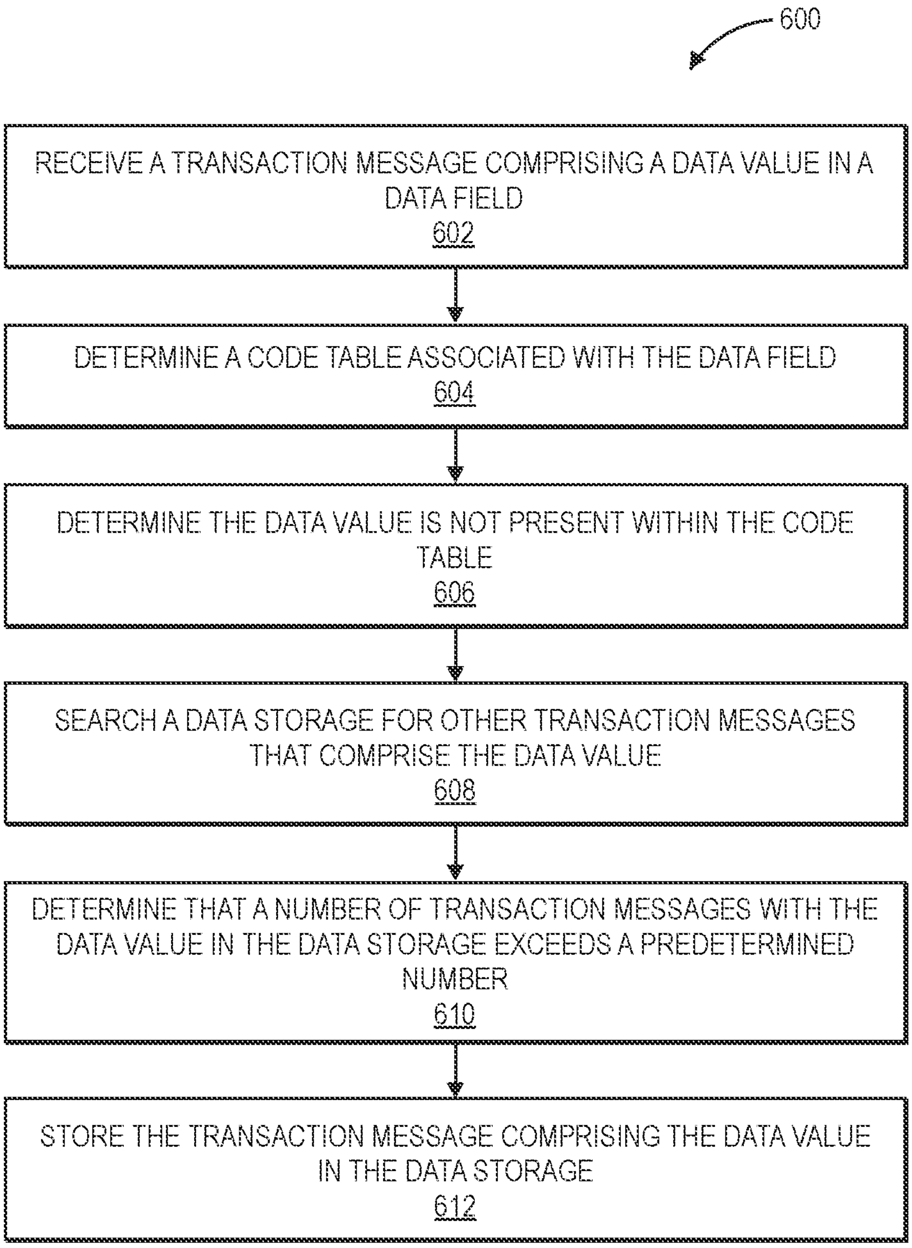
FIG. 6 shows a flowchart illustrating methods according to embodiments.

FIG. 6 shows an example flowchart 600 of a process for identifying messages with a data value in a data field that is not present in a code table. Some of the components in FIG. 5 are referred to in the process described with respect to FIG. 6.

At 602, the server computer can receive a transaction message comprising a data value in a data field. In some embodiments, the transaction message can be an authorization request message such as those described above. The server computer could be the processing computer 108, 200.

At 604, the lookup analyzer can determine a code table associated with the data field. For example, data field 302 "D5" from FIG. 3 may be associated with code table 400 "T5" from FIG. 4. In this regard, the server computer can have mappings between data fields and code tables.

At 606, the lookup analyzer can determine if the data value is or is not present within the code table. The code table may list and define a plurality of data values and their corresponding descriptors. If the data value is defined in the code table, the lookup analyzer can accept the data value. The transaction message can be then stored in the second data storage of the server computer.

If the data value is not present within the code table, then the server computer can use one or more initial filtering criteria to determine if the data value is clearly invalid or erroneous. For example, if an expected data value in a data field is supposed to be a two letter code and the received data value is two numbers, then that data value is clearly invalid or erroneous. In this case, the transaction message with the invalid or erroneous data value can be discarded and/or declined.

If the data value is not present within the code table, then at 608, the lookup analyzer can search the first data storage for other transaction messages that comprise the data value. Based on the results, the lookup analyzer can gather information related to a number and frequency of transaction messages in the first data storage that comprise the data value.

At 610, the lookup decision tree can determine whether or not the number of transaction messages with the data value in the first data storage exceeds the predetermined number and/or frequency. If so, then at 612, the lookup feeder can store the transaction message comprising the data value in the second data storage (e.g., the data lake). In some embodiments, the lookup feeder may also store the plurality of transaction messages with the data value from the first data storage in the second data storage.

In some embodiments, the server computer can update the code table associated with the data field to list and define the data value. As a result, if the server computer receives a future transaction message comprising the data value in the data field, it can be recognized as a valid data value and the transaction message can be stored in the second data storage.

If the lookup decision tree determines that the number of transaction messages with the data value in the first data storage does not exceed the predetermined number, then the server computer can record information related to the transaction message in the first data storage. At a later time, the server computer may determine that the data value is valid and store the transaction message and any other transaction messages with the data value in the second data storage. For example, if the server computer receives additional transaction messages with the data value in the data field, then the number of transaction messages with the data value in the first data storage may increase to exceed the predetermined number and/or frequency at a later time.

Figure 7:
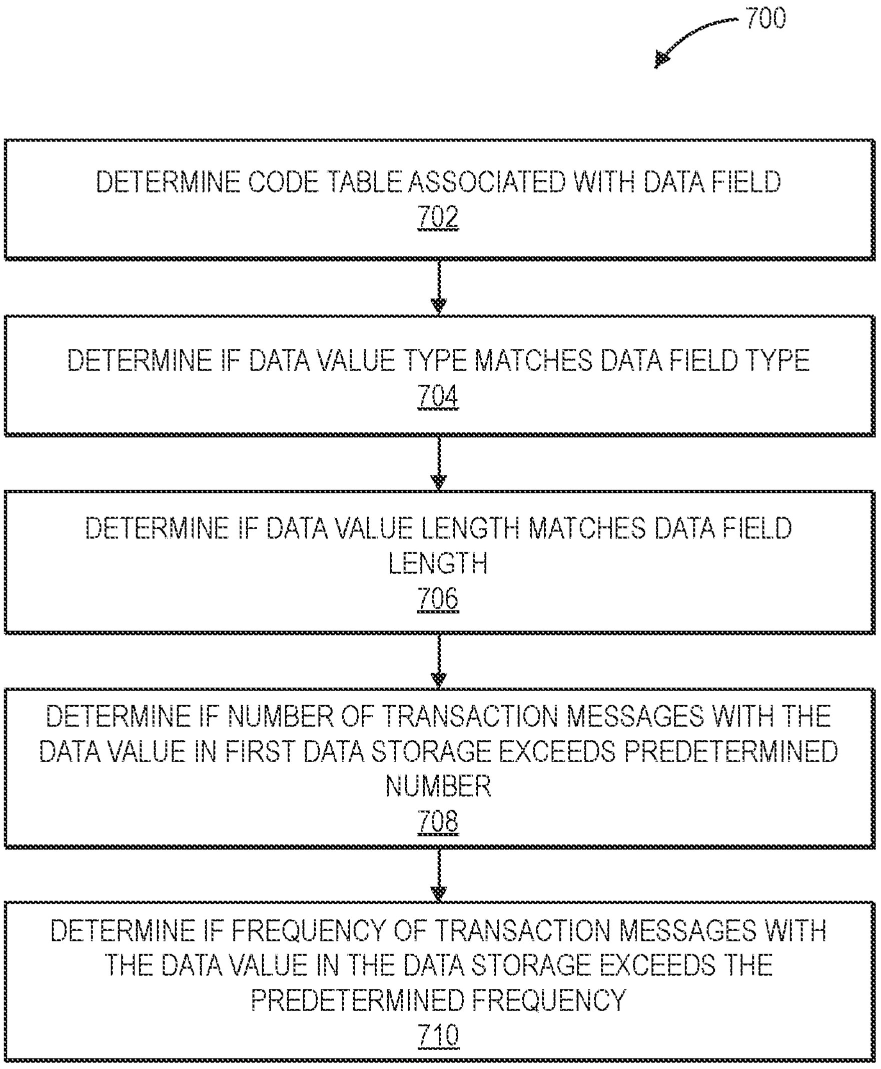
FIG. 7 shows another flowchart illustrating methods according to embodiments.

FIG. 7 shows a flowchart 700 of a for identifying if a data value is valid or not. When the server computer receives a transaction message with a data value in a data field, and the lookup analyzer can determine that the data value is not in the code table associated with the data field, embodiments can use process flow 700 to determine if the data value is valid or not.

At 702, the lookup decision tree can determine the code table associated with the data field. The server computer can store many code tables and can associate them with different data fields.

At 704, the lookup decision tree can determine if the data value type matches the data field type. Each data field in a transaction message can have an expected data format (e.g., numbers, letters, a combination of numbers and letters). If the data format of the data value does not match the expected data format of the data field (e.g., the expected data value is two letters, but the received data value is two numbers), then the server computer can determine that data value is erroneous or invalid. It can then be deleted or possibly stored in a separate data storage for future analysis. Otherwise, if the data type of the data value is a match (e.g., the expected data value is two letters, and the received data value is two letters), then the server computer can proceed to 706.

At 706, the lookup decision tree can determine if the length of the data value matches the length of the data field. If the data value length does not match the data field length (e.g., the expected data value is two letters, but the received data value is three letters), then the server computer can determine that the data value is in invalid. It can then be deleted or possibly stored in a separate data storage for future analysis.

At 708, if the data type and data length of the data value are a match, the lookup decision tree can determine if the number of transaction messages with the data value in the first data storage exceeds the predetermined number. In some embodiments, the predetermined number can determined using machine learning and historical transaction data and may vary depending on the code table. If the number of transaction messages with the data value in the first data storage does not exceed the predetermined number, embodiments can record information related to the transaction message in the first data storage so that it is stored with the other transaction messages.

At 710, if the number of transaction messages with the data value in the first data storage exceeds the predetermined number, the lookup decision tree can determine if the frequency of transaction messages with the data value in the first data storage exceeds the predetermined frequency. The frequency can be based on the rate that the data value has appeared in transaction messages during a given period of time. The number of transaction messages with the data value in the first data storage and the total number of transaction messages during a given period of time can be used to calculate a frequency of the data value. For example, if the server computer has received a total of 100 transaction messages and 50 of the transaction messages comprise the data value in the data field, the frequency of the data value is 50%. The lookup decision tree can compare the frequency of the data value to the predetermined frequency. If the frequency of transaction messages with the data value in the first data storage does not exceed the predetermined frequency, then the server computer can then record information related to the transaction message in the first data storage.

If the number of transaction messages with the data value in the first data storage does exceed the predetermined frequency, the lookup feeder can store the transaction message in the second data storage. In some embodiments, the associated code table can be updated to include the data value. In some embodiments, the lookup feeder can store in the second data storage the transaction messages with the data value in the first data storage.

Figure 8:
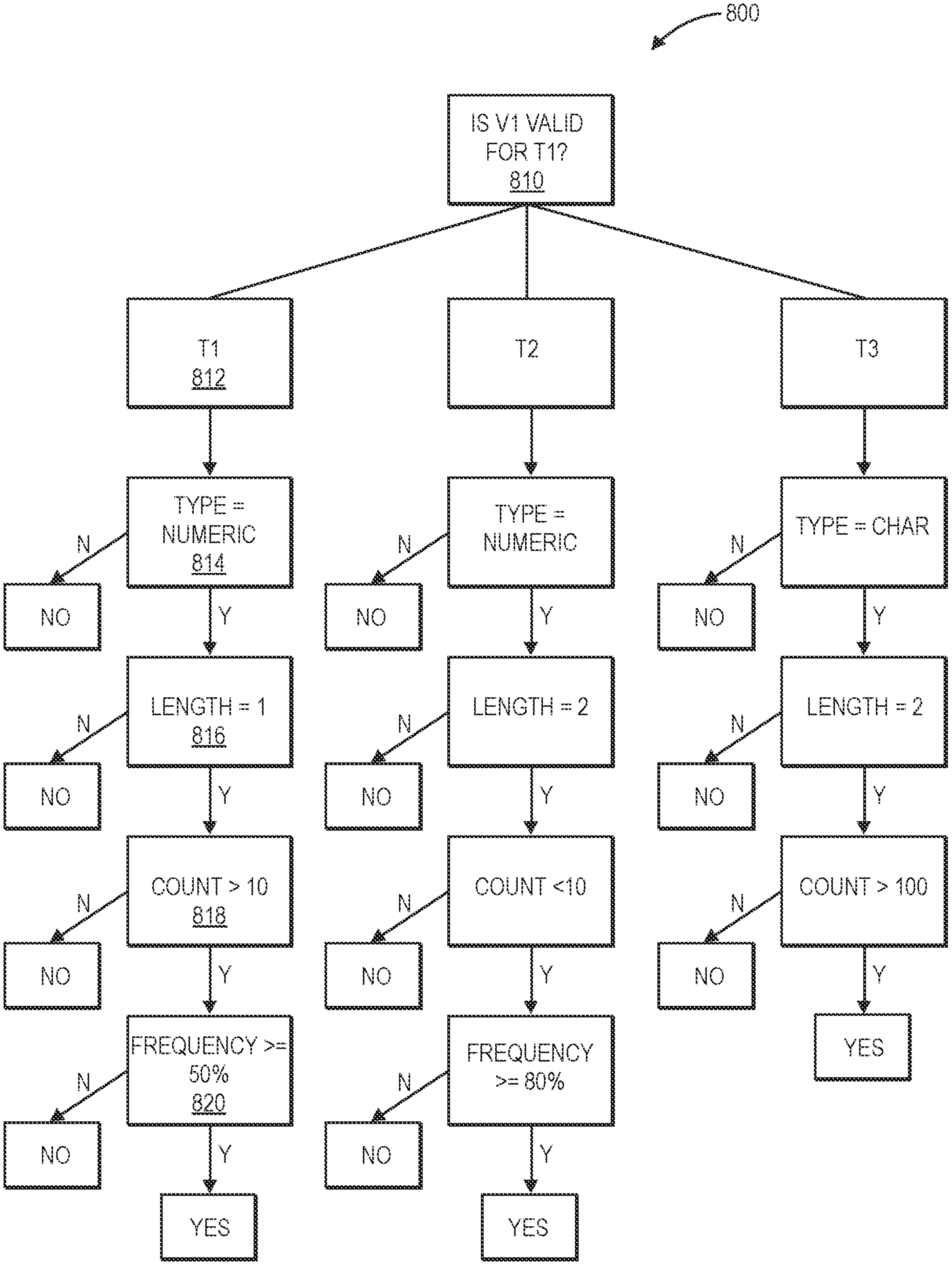
FIG. 8 shows a flow diagram of an example decision tree according to embodiments.

FIG. 8 shows a flow diagram of an example decision tree according to embodiments. FIG. 8 can be an exemplary illustration of the process flow 700 of FIG. 7. Decision tree 800 can be used to determine if a data value is valid or not. As illustrated, different decision processes can be performed depending upon the code table (e.g., T1, T2, T3).

When the server computer receives a transaction message with a data value in a data field, and the lookup analyzer determines that the data value is not present in the code table associated with the data field, the server computer can use the lookup decision tree to determine if the data value is valid or not. The decision tree 800 may be formed using a machine learning process.

At 810, the server computer can use the lookup decision tree and can receive data value V1 associated with code table T1.

At 812, the lookup decision tree can determine a code table T1 based on the data field holding the data value V1. The code table T1 may be a table that has data values that are numeric and are 1 digit or character in length.

At 814, after determining the code table T1, the lookup decision tree can check to see if the data value V1 is of a data type associated with the table T1. For example, if the associated code table T1 is for data values with a numeric data type, the lookup decision tree can check if the data type of V1 is numeric. If the data value V1 is numeric, then the decision process can proceed to step 816. If the data type is not numeric, then the server computer can determine that the data value V1 is invalid or erroneous. If the data value V1 is invalid or erroneous, the transaction message containing the data value can then be deleted or stored in a separate data storage for future evaluation.

At 816, the lookup decision tree can check the length of V1. If code table T1 is for data values with 1 digit or character, then the lookup decision tree can check to see if V1 is 1 digit. If V1 is one digit, then the decision process can be provided to step 818. If V1 not one digit long, then the server computer can determine that the data value V1 is invalid or erroneous. If the data value V1 is invalid or erroneous, the transaction message containing the data value can then be deleted or stored in a separate data storage for future evaluation.

Steps 814 and 816 are pre-filtering steps. If the data value being analyzed does not satisfy certain formatting criteria of the data value of interest, then the server computer can conclude that the data value is erroneous or invalid, and further processing is not required.

Steps 818 and 820 can be steps that can determine if a sufficient number and/or frequency of transactions messages containing the data value not found in the code table is/are present. A large number of transaction messages with the data value or a high frequency of transaction messages with the data value within a time period may indicate that the data value is valid or legitimate, even though it is not in a code table.

At 818, the server computer can use the lookup decision tree to determine if the number of transaction messages with the data value in the first data storage exceeds the predetermined number. The machine learning model may have determined that the predetermined number is 10, and that this is a sufficient number for the server computer to conclude that the data value is very likely to be valid. The lookup analyzer in the server computer may have already searched the first data storage for transaction messages with the data value and determined that several transactions with the data value are stored in it. The server computer may determine if the number of stored transaction messages with the data value is greater than 10 or not. If the server computer determines that the number of stored transaction messages is greater than 10, then the decision process can proceed to step 820. If the server computer determines that the data value is less than or equal to 10, then then the server computer can determine that the status of the data value V1 is indeterminate (i.e., either invalid or valid). If the data value V1 is indeterminate, then the transaction message containing the data value can be saved to the first data storage.

At 820, the server computer can use the lookup decision tree can determine if the frequency of transaction messages with the data value in the first data storage exceeds the predetermined frequency. Using the training data, the machine learning model for T1 may have determined that the predetermined frequency is 50%. If the number of transaction messages with the data value in the first data storage is greater than or equal to 50%, then the server computer can determine that the data value is valid and can store the transaction message in the second data storage. The server computer can also add the data value to the code table once it has determined the descriptor that corresponds to the data value. The determination of the descriptor can be performed using a manual or automated analysis (e.g., human analysis of the code and the contact with an authorizing entity that may have created the code).

In a specific example, an authorizing entity (e.g., an issuer) operating an authorizing entity computer may have created a new code for a particular type of transaction device (e.g., a smartwatch) that it recently introduced to users. However, the new code may not be present in the device type code table in the server computer. However, the authorizing entity may not have provided the new code to the server computer, because it has not yet had the opportunity to do so or because of a delay in providing the data to the entity that operates the server computer.

If at any point in the flow diagram the missing data value does not match the expected data format or the number or frequency of transaction messages in the first data storage do not meet the threshold requirements, then the missing data value is not predicted to be valid. In this case, embodiments do not store the transaction message comprising the missing data value in the second data storage. In some embodiments, the lookup decision tree can record information related to the transaction message and store it in the first data storage.

FIG. 9 shows a table 900 of transaction data for four different transaction messages with data values. The transaction data comprises 7 columns: table 910 referring to the code table (T11-T14) to which the data value is being compared against, value 912 referring to the data value, type 914 referring to the type of the data value, length 916 referring to the length of the data value, count 918 referring to the number of transaction messages with the data value in the first data storage, frequency 920 referring to the frequency of transaction messages with the data value in the first data storage, and answer 922 referring to whether or not the data value is missing in the associated code table.

Row 902 provides data relating to transaction information for a transaction message with a data value "1" in a data field associated with code table T11, row 904 is for another transaction message with the data value "23" in a data field associated with code table T12, row 906 is for another transaction message with the data value "AA" in a data field associated with code table T13, and row 908 is another transaction message with the data value "2" in a data field associated with code table T11. The values "1" and "2" could be in different data fields, but may refer to same code table T11. For example, this could occur if a transaction has a source country code and a destination country code, and both codes would refer to a country code table.

Of the four transaction messages, only the transaction message in row 906 comprises a data value "AA" that has an answer "No" in column 922. This indicates that the server computer, using the decision tree, has determined that the data value is very likely invalid or erroneous. For example, the decision tree may have determined that the data value has a character type and length that is expected for its data field. However, because the count 918 and frequency 920 are "0" there is insufficient past data regarding the data value to conclude that it is valid. The transaction data associated with this transaction can then be deleted, or stored in a separate data storage for future evaluation by an analyst to determine why the invalid or erroneous data value was present in the transaction message.

Rows 902, 904, and 908 all correspond to transaction messages that would be stored in the second data storage after applying the decision tree since the server computer determined that they were valid, despite not be present in existing code tables when the transaction messages containing them were received by the server computer. These codes can be added to the appropriate data tables (e.g., T1 and T2) along with appropriate descriptors since they were determined to be valid.

Embodiments have a number of technical advantages. As illustrated above, embodiments provide for improved data collection and validation by preventing the automatic cancellation or deletion of transaction messages because data values within the transaction messages cannot be found in appropriate code tables. A data lake of data that would otherwise be canceled or deleted, and data values that correspond to valid or legitimate codes can be quickly identified and corresponding code tables can be quickly updated. By preventing the cancellation or deletion of otherwise valid transaction messages, embodiments of the invention save a significant amount of computing resources and time.

Although the above examples relate to the validation and processing of data values in transaction requests in a financial transaction context, embodiments of the invention are not limited thereto. For example, the transaction messages could be data access transaction messages where a client computer seeks to access data from a server computer, and the access transaction message contains a number of data fields with data values (or codes) describing the aspects of a data access request (e.g., client computer type, operating system type, timestamp, IP service provider, etc.).

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

accessing a first data storage and a second data storage, wherein the first data storage is different from the second data storage;

receiving, by a server computer, a transaction message comprising a data value in a data field;

determining, by the server computer, a code table associated with the data field;

determining, by the server computer, whether or not the data value is present within the code table;

when the data value is present within the code table, accepting the data value;

responsive to determining that the data value is not present within the code table, executing a decision tree, which is trained using a machine learning process on data related to a plurality of transaction messages stored in the second data storage, to determine that a format of the data value is an expected data format for the data field, the expected data format being a number and/or type of characters;

responsive to determining that the data value has the expected data format, searching, by the server computer, the first data storage for other transaction messages that comprise the data value;

when the data value does not have the expected data format, storing information related to the transaction message in the first data storage;

in response to searching, executing the decision tree to determine, by the server computer, if a number of transaction messages with the data value in the first data storage exceeds a predetermined number and/or frequency;

when the number of transaction messages with the data value in the first data storage exceeds the predetermined number and/or frequency, then storing the transaction message comprising the data value in the second data storage;

when the number of transaction messages with the data value in the first data storage does not exceed the predetermined number and/or frequency, storing the transaction message comprising the data value in the first data storage without storing the transaction message comprising the data value in the second data storage; and updating the decision tree by executing the machine learning process with additional transaction data.

2. The method of claim 1, wherein the second data storage is a data lake or a data warehouse.

3. The method of claim 1, wherein the first data storage stores data related to a plurality of transaction messages comprising the data value in the data field, the data value not being within the code table associated with the data field.

4. The method of claim 3, further comprising, when the number of transaction messages with the data value in the first data storage exceeds the predetermined number and/or frequency, storing in the second data storage the plurality of transaction messages comprising the data value in the data field, the data value not being within the code table associated with the data field.

5. The method of claim 1, wherein in response to searching, the server computer determines that the number of transaction messages with the data value in the first data storage exceeds the predetermined number.

6. The method of claim 1, wherein in response to searching, the server computer determines that the number of transaction messages with the data value in the first data storage exceeds the predetermined frequency.

7. The method of claim 1, wherein in response to searching, the server computer determines that the number of transaction messages with the data value in the first data storage exceeds the predetermined number and the predetermined frequency.

8. The method of claim 1, further comprising, before searching the first data storage:

when the data value is not present within the code table, determining a format of the data value is not an expected data format for the data field, the expected data format being a number and/or type of characters.

9. The method of claim 1, further comprising:

in response to searching, determining, by the server computer, that the number of transaction messages with the data value in the first data storage does not exceed the predetermined number and/or frequency.

10. The method of claim 1, further comprising:

storing the data value in the code table.

11. The method of claim 1, wherein when the number of transaction messages with the data value in the first data storage does not exceed the predetermined number and/or frequency, the method further comprises storing information related to the transaction message in the first data storage.

12. The method of claim 1, wherein the predetermined number and frequency are determined by a machine learning model trained on data related to a plurality of transaction messages stored in the second data storage.

13. A server computer comprising:

a processor; and a computer readable medium comprising code, executable by the processor for performing a method comprising:

accessing a first data storage and a second data storage, wherein the first data storage is different from the second data storage;

receiving, by the server computer, a transaction message comprising a data value in a data field;

determining, by the server computer, a code table associated with the data field;

determining, by the server computer, whether or not the data value is present within the code table;

when the data value is present within the code table, accepting the data value;

responsive to determining that the data value is not present within the code table, executing a decision tree, which is trained using a machine learning process on data related to a plurality of transaction messages stored in the second data storage, to determine that a format of the data value is an expected data format for the data field, the expected data format being a number and/or type of characters;

responsive to determining that the data value has the expected data format, searching, by the server computer, the first data storage for other transaction messages that comprise the data value;

when the data value does not have the expected data format, storing information related to the transaction message in the first data storage;

in response to searching, executing the decision tree to determine, by the server computer, if a number of transaction messages with the data value in the first data storage exceeds a predetermined number and/or frequency;

when the number of transaction messages with the data value in the first data storage exceeds the predetermined number and/or frequency, then storing the transaction message comprising the data value in the second data storage;

when the number of transaction messages with the data value in the first data storage does not exceed the predetermined number and/or frequency, storing the transaction message comprising the data value in the first data storage without storing the transaction message comprising the data value in the second data storage; and updating the decision tree by executing the machine learning process with additional transaction data.

14. The server computer of claim 13, wherein the method further comprises:

storing the data value in the code table.

15. The server computer of claim 13, wherein the method further comprises:

in response to searching, determining, by the server computer, that the number of transaction messages with the data value in the first data storage does not exceed the predetermined number and/or frequency.

16. The server computer of claim 13, wherein the first data storage stores data related to a plurality of transaction messages comprising the data value in the data field, the data value not being within the code table associated with the data field.

17. The server computer of claim 16, wherein the method further comprises:

when the number of transaction messages with the data value in the first data storage exceeds the predetermined number and/or frequency, storing in the second data storage the plurality of transaction messages comprising the data value.

18. The server computer of claim 13, wherein the predetermined number and/or frequency is determined by a machine learning model trained on data related to a plurality of transaction messages stored in the second data storage.

* * * * *